3,478,008

PREPARATION OF PROPYLENE HAVING INTERMEDIATE CRYSTALLINITY WITH A CATALYST COMPRISING (1) TiCl₄-METAL HYDRIDE-ALKYL ALUMINUM HALIDE AND (2) ALUMINUM TRIALKYL

Harvey D. Ledbetter, Walnut Creek, Calif., assignor to The Dow Chemical Company, Midland, Mich., a corporation of Delaware
No Drawing. Filed July 12, 1965, Ser. No. 471,474
Int. Cl. C08f *1/52, 1/48;* B01j *11/84*
U.S. Cl. 260—93.7                                   5 Claims

ABSTRACT OF THE DISCLOSURE

High molecular weight polypropylene having intermediate crystallinity is prepared by polymerizing propylene in the presence of a catalyst composition which is a reaction product obtained by reacting together titanium tetrachloride, a metal hydride, an alkylaluminum halide activator, and an alkyl aluminum compound.

---

This is a continuing application of my copending application Ser. No. 135,744, filed Sept. 5, 1961, now abandoned.

This invention relates to the preparation of high molecular weight olefin polymers, especially polypropylene. It particularly concerns a polymerization catalyst and process for polymerizing propylene to a high molecular weight solid polymer product having intermediate crystallinity.

It is known, e.g. from Belgian Patent 538,782, to polymerize propylene in the presence of a Ziegler-type catalyst mixture of titanium tetrachloride and a trialkylaluminum such as triethylaluminum to obtain a high molecular weight solid polymer. It is also known that the resulting polypropylene is mostly amorphous rather than crystalline. According to Belgian Patent 543,259, highly crystalline polypropylene having regular steric configuration (isotactic) is obtained when propylene is polymerized in contact with solid, crystalline catalysts, such as mixtures of titanium trichloride and tri(higher alkyl) aluminums. However, the results of propylene polymerization with such catalysts are affected and made widely variable by the crystalline form of the titanium trichloride, its particle size and shape, the kind and amount of impurities therein, its history prior to use, etc. On the other hand titanium tetrachloride is readily available in a form of consistent high purity.

Accordingly, it is a general object of this invention to provide for the preparation of high molecular weight olefin polymers, especialy for the preparation of high molecular weight crystalline polypropylene by polymerization of propylene in contact with a catalyst comprising titanium tetrachloride. A more specific object is to provide for the polymerization of propylene in contact with a catalyst comprising titanium tetrachloride to obtain a high molecular weight solid polypropylene having a higher degree of crystallinity than is normally obtained with catalyst mixtures of titanium tetrachloride and trialkylaluminums. Another object is to provide new modifications of polymerization catalysts comprising titanium tetrachloride which are active in polymerization of propylene to high molecular weight polymer products having intermediate crystallinity. Other objects and advantages of the invention will become evident in the following description.

The objects of this invention have been attained in a process of polymerization of olefins, especially propylene, and in a catalyst therefor wherein the catalyst, broadly contemplated, is a reaction product obtained by intimately admixing and reacting together titanium tetrachloride, a metal hydride, and a trialkylaluminum. In a more specific and preferred embodiment, the catalyst is the reaction product of intimate admixture, conveniently in an inert liquid diluent, of a trialkylaluminum with the reaction product of intimate admixture, advantageously with heating, of a metal hydride and titanium tetrachloride optionally in the presence of an alkylaluminum halide activator. The resulting catalyst composition is employed in the polymerization of olefins to high molecular weight polymers and especially of propylene whereby there is obtained a polypropylene having an intermediate degree of crystallinity.

The catalysts for use in accordance with this invention are compounded from titanium tetrachloride, a metal hydride, and a trialkylaluminum. Any metal hydride can be used, including the alkali metal hydrides, alkaline earth metal hydrides, earth metal hydrides, transition metal hydrides, and double hydrides, complex hydrides, and mixed hydrides. Specific metal hydrides, for purpose of illustration and not of limitation, are sodium hydride, potassium hydride, lithium hydride, magnesium dihydride, calcium dihydride, strontium dihydride, aluminum trihydride, titanium dihydride, zirconium dihydride, $LiAlH_4$, $NaAlH_4$, $NaBH_4$, $KBH_4$, $Mg(BH_4)_2$, etc. Any trialkylaluminum can be used, including those wherein the alkyl groups are the same or different and have straight or branched chains. Specific examples, for purpose of illustration and not of limitation, are trimethylaluminum, triethylaluminum, tripropylaluminum, tributylaluminum, triisobutylaluminum, tripentylaluminum, trihexylaluminum, triheptylaluminum, trioctylaluminum, tridecylaluminum, tridodecylaluminum, tritetradecylaluminum, trioctadecylaluminum, etc.

The relative amounts of the just mentioned titanium tetrachloride, metal hydride, and trialkylaluminum which are employed and the conditions of preparing the catalytically active admixture thereof are not critical inasmuch as beneficial results are invariably attained in some degree. As a general practice, the metal hydride is employed in proportion of from about 0.1 to about 10 equivalent hydride per mole of titanium tetrachloride. By "equivalent hydride" is meant the part of a mole thereof equivalent to one reactive hydrogen. The trialkylaluminum is generally used in proportion of from about 0.1 to about 10 moles thereof per mole of titanium tetrachloride.

Conveniently, the catalyst-forming ingredients are admixed and inter-reacted in an inert liquid adapted for use as a polymerization vehicle. Conventional such media such as inert liquid hydrocarbons which are known to the art are suitable for the present purposes. In one embodiment, the titanium tetrachloride and metal hyride are added to and admixed with an inert liquid vehicle such as a saturated mineral oil or hydrogenated kerosene under an inert gas atmosphere such as dry nitrogen free of carbon dioxide, air, acids, etc. The mixture can be agitated, heated, and held until the desired degree of interaction has taken place in accordance with the selection of one skilled in the art. Agitation, if desired, is provided by any of various well-known means such as agitators, stirrers, blades, paddles, propellers, pumps, shakers, ball mills or rod mills. The reaction temperature can range from room temperature to about 300° C., from about 80° to about 250° C. being generally preferred. Intensive agitation usually allows a lower temperature. The reaction time for this step of the catalyst preparation is usually inversely related to the temperature and to the intensity of agitation and is in the order of 15 minutes to an hour or more.

The foregoing operations and reaction of the metal hydride and titanium tetrachloride can be carried out advantageously in the presence of an activator of the Lewis acid type. Suitable Lewis acid activators are alkylaluminum halides such as $RAlCl_2$, $R_2AlCl$, $R_3Al_2Cl_3$ and the corresponding alkylaluminum bromides and iodides wherein R is alkyl and, where multiple, may be the same or different. The activator may be used in any desired proportion, advantageously from about 0.1 to 10 moles thereof per mole of titanium tetrachloride. In one embodiment, the metal hydride, titanium tetrachloride, and Lewis acid activator are mixed together in an inert hydrocarbon liquid medium, stirred at room temperature for about one hour, then heated to about 80° C. for 30 minutes. The trialkylaluminum is added, and the resulting mixture is stirred at 80° C. for a further five minutes before introducing propylene and commencing the polymerization. In another embodiment, the mixture of hydride, titanium tetrachloride, and hydrocarbon medium is heated at about 80° C. for about 30 minutes, the trialkylaluminum is added and held for about five minutes before commencing polymerization. In still another embodiment, the mixture of hydride, titanium tetrachloride, and inert liquid medium is heated gradually to about 110° C. with stirring, the trialkylaluminum is added, and after about five minutes, the mixture is cooled to about 80° C. for polymerization.

The resulting reaction mixture of titanium tetrachloride, metal hydride and trialkylaluminum (whether or not a Lewis acid activator has been used in its preparation) is catalytically active to initiate and promote the addition polymerization of ethylenically unsaturated compounds, especially olefinic hydrocarbons having terminal unsaturation such as ethylene, propylene, 1-butene, 1-pentene, 1-hexene, 1-heptene, 1-octene, 1-decene, 1-dodecene, etc. and their branched isomers, particularly ones having the structural formula $CH_2=CHR$ where R is hydrogen or alkyl, and styrene-type compounds having the formula just given where R is aryl.

The polymerization procedures using the new catalysts are similar to those already known for Ziegler-type catalysts, e.g. procedures for polymerization of ethylene with a Ziegler-type catalyst mixture of titanium tetrachloride and triethylaluminum. Conveniently, the catalyst composition in an inert liquid medium is maintained at a polymerization temperature with stirring while the polymerizable monomer is fed in until the desired degree of polymerization is attained or until polymerization ceases. Additional catalyst and/or additional trialkylaluminum and/or additional liquid diluent can be fed in if desired. Conventional batch or continuous process techniques are readily used with the new catalysts. The resulting polymer is recovered, freed of catalyst residues and liquid diluent, and processed in usual ways known to this kind of art.

The catalysts of this invention are particularly valuable in the polymerization of propylene to a high molecular weight solid polymer having an unexpected kind and degree of crystallinity.

In the practice of the method of this invention for the polymerization of propylene, the concentration of the catalyst in the inert liquid diluent medium is usually adjusted to from about 5 to about 100 milligram-moles of titanium tetrachloride per liter of reaction mixture. The polymerization is carried out at a polymerization temperature, usually in the range of from about 20° to about 200° C., preferably between about 25° and 160° C. The pressure is not critical and can range from sub-atmospheric to as high as is technically possible.

There is thereby obtained a high molecular weight, substantially linear, solid polypropylene. The specific viscosities (measure of molecular weight, taken at 135° C. on solutions of 0.1 gram of polymer in 100 ml. of decahydronaphthalene) range from about 0.01 to 1 or more. The densities range from about 0.89 to about 0.92 gram per cubic centimeter.

Unexpectedly, the solid polypropylene products of this invention have intermediate values of crystallinity. As measured graphically from X-ray diffraction data, the crystallinity of these polypropylene products is in the order of 30 to 60 percent. These values contrast with those of atactic polypropylene having zero crystallinity and with those of highly isotactic polypropylene whose crystallinity exceeds 60 percent or even 70 percent in some cases. Polypropylene made with a Ziegler-type catalyst mixture of titanium tetrachloride and triethylaluminum is found to have crystallinity in the order of 10–20 percent.

Moreover, the solid polypropylene products of this invention are unexpectedly found to have a peculiar distribution of crystallinity in that they are not merely mixtures of atactic and isotactic polymers but instead have a lower proportion of ether-soluble components as well as a lower proportion of heptane-insoluble components. Thus these products distinguish over the usual low-crystallinity materials in being substantially insoluble in ether but also distinguish over the usual high-crystallinity materials in being more soluble in n-heptane.

The invention is illustrated by the following examples which are not to be construed as limiting its scope. Parts and percentages are by weight unless otherwise specified. Throughout the examples, X-ray crystallinity is calculated by graphical analysis of X-ray diffraction data and specific viscosity is measured on a solution of 0.1 gram of the polymer in 100 ml. of decahydronaphthalene at 135° C.

EXAMPLE 1

Into a ploymerization reaction vessel is placed 500 ml. of dry, hydrogenated kerosene under an atmosphere of nitrogen. With agitation there is added 30 ml. of 1.0 M triisobutylaluminum solution in kerosene, 0.46 g. of sodium hydride (52 percent mineral oil), and 10 ml. of 1.0 M titanium tetrachloride in kerosene, the mixture being maintained at 37° C. to provide a polymerization catalyst composition. Propylene gas is fed into the reactor over a 3-hour period at an average temperature of 37° C. Polymerization is terminated by adding n-butanol and hydrochloric acid to the reactor. The polymer product is collected on a filter, washed with ethanol and hydrochloric acid and water and dried. There is thereby obtained polypropylene having X-ray crystallinity of 31 percent and specific viscosity of 0.150.

These results are in contrast to those obtained when the foregoing tests repeated but without the sodium hydride constitutent, in which case the polypropylene product has X-ray crystallinity of 12 percent and specific viscosity of 0.185.

EXAMPLE 2

A mixture of 700 ml. of purified mineral oil, 614 ml. of titanium tetrachloride, and 16.2 grams of sodium hydride is agitated and heated to 200° C. The mixture is added to six gallons of purified kerosene held at 85° C. in a polymerization reactor. To the resulting mixture is added about two gram-moles of triisobutylaluminum thereby forming a polymerization catalyst composition. Propylene is then added to the reactor at a pressure of 100 p.s.i.g. and at 85° C. during a period of three hours. The reaction is terminated by adding n-butanol and hydrochloric acid and venting off the unreacted propylene. The polymer is collected on a filter, washed with cold acetone and dried. The resulting polypropylene has an X-ray crystallinity of 55 percent, and specific viscosity of 0.278.

EXAMPLES 3–11

A general procedure is repeated in these examples in which 200 ml. of dry, purified, air-free mineral oil is placed in a polymerization reactor together with 10 milli-gram-moles of titanium tetrachloride and one of the metal hydrides shown in Table I below in the amount shown therein. The mixture is heated to the temperature shown in the table for 30 minutes and then cooled to 80° C. Thereto is then added 30 milligram-moles of triethylaluminum and 300 ml. of purified kerosene, forming a polymerization catalyst composition. Propylene is fed into the reactor containing the polymerization catalyst composition at atmospheric pressure for two hours, the temperature of the reaction mixture being maintained at 80° C. The reaction is terminated by adding n-butanol and hydrochloric acid. The polymer product is collected on a filter, washed with ethanol, and dried. The X-ray crystallinities and specific viscosities of the products are shown in the table.

TABLE I

| | Metal Hydride | | Temp.,[1] °C. | Product | |
|---|---|---|---|---|---|
| Example | Kind | Mg. Moles | | Crystallinity, percent | Specific Viscosity |
| 3 | LiH | 3 | 200 | 38 | 0.149 |
| 4 | LiH | 30 | 200 | 42 | 0.155 |
| 5 | MgH₂ | 50 | 250 | 39 | 0.141 |
| 6 | CaH₂ | 20 | 250 | 50 | 0.190 |
| 7 | LiAlH₄ | 10 | 100 | 40 | 0.119 |
| 8 | TiH₂ | 50 | 200 | 46 | 0.168 |
| 9 | NaBH₄ | 1 | 150 | 36 | 0.137 |
| 10 | NaH | 4 | 200 | 48 | |
| 11 | NaH | 10 | 180 | 59 | |

[1] Temperature to which mixture of titanium tetrachloride and metal hydride is heated before addition of triethylaluminum.

EXAMPLES 12–17

In this group of examples a standard procedure is used with variations to show the use of Lewis acid activators in the step of reacting titanium tetrachloride with the metal hydrides. To 500 ml. of purified kerosene are added 10 milligram moles of titanium tetrachloride and a metal hydride and a Lewis acid of kinds and in amounts shown in Table II. In Example 12 the mixture is stirred and heated at 100° C. for about 30 minutes, after which 40 milligram-moles of triethylaluminum is added and the resulting catalyst composition is stirred for 5 minutes before commencing the polymerization. In Examples 13 through 17, the mixture of kerosene, titanium tetrachloride, and metal hydride is stirred and heated gradually over a period of about one hour to 150° C. After 5 minutes at such temperature, 20 milligram-moles of triethylaluminum is added and stirring is continued at 150° C. for another 5-minute period. The resulting catalyst mixture is then cooled to polymerization temperature.

In each example, propylene gas is run into the reactor at atmospheric pressure with stirring of the reaction mixture at a polymerization temperature shown in Table II. In Examples 13 through 17 a further quantity of 20 milligram-moles of triethylaluminum is added to the reaction mixture during the polymerization. The reaction is terminated by adding alcohol and acid. The polypropylene is collected on a filter, washed and dried. The crystallinity of the respective polypropylene products is shown in Table II.

TABLE II

| | Metal Hydride | | Activator | | Polymerization Temp., °C. | Product Crystallinity, Percent |
|---|---|---|---|---|---|---|
| Example | Kind | Mg. Moles | Kind | Mg. Moles | | |
| 12 | NaH | 2 | EtAlCl₂ | 10 | 100 | 52 |
| 13 | NaH | 10 | (Et)₃Al₂Cl₃ | 5 | 80 | 58 |
| 14 | NaH | 10 | EtAlCl₂ | 10 | 80 | 46 |
| 15 | LiH | 10 | (Et)₃Al₂Cl₃ | 5 | 100 | 40 |
| 16 | LiAlH₄ | 10 | (Et)₃Al₂Cl₃ | 5 | 80 | 43 |
| 17 | MgH₂ | 10 | (Et)₃Al₂Cl₃ | 5 | 100 | 38 |

In place of the particular activators used in Examples 12–17 other Lewis acids are used with similar results. In place of the particular metal hydrides used in the foregoing examples, other metal hydrides are used with substantially similar results in preparing polypropylene having intermediate crystallinity.

In like manner the catalyst compositions of this invention can be used to effect the polymerization of ethylenically unsaturated monomers, especially olefinic hydrocarbons having terminal unsaturation, i.e. 1-olefins.

What is claimed is:

1. A polymerization catalyst composition useful for polymerizing ethylenically unsaturated monomers, which catalyst is the reaction product of an intimate admixture (B) of (1) a trialkylaluminum with (2) the reaction product of an intimate admixture (A) of (a) a metal hydride having only metal and hydrogen atoms, (b) an alkylaluminum halide activator and (c) titanium tetrachloride, the constituents being employed in proportions of from about 0.1 to about 10 equivalents of the metal hydride and from about 0.1 to about 10 moles each of the alkylaluminum halide activator and of the trialkylaluminum per mole of titanium tetrachloride, said reaction product (2) having been obtained by heating said admixture (A) in the range from room temperature to about 300° C.

2. A polymerization catalyst composition according to claim 1 wherein the reaction product (2) is obtained by heating said admixture (A) at temperature in the range from 100° to 150° C. in an inert liquid hydrocarbon diluent.

3. A polymerization catalyst composition according to claim 1 wherein the reaction product (2) is obtained by heating said admixture (A) in the range from about 80° C. to about 250° C. in an inert liquid hydrocarbon diluent.

4. A process for polymerizing propylene to a high molecular weight polymer having intermediate crystallinity by contacting propylene at a polymerization temperature in the range from about 20° to about 200° C. with a reaction medium comprising the polymerization catalyst.

5. A process for polymerizing propylene to a high molecular weight polymer having intermediate crystallinity by contacting propylene at a polymerization temperature in the range from about 20° to about 200° C. with a reaction medium comprising the polymerization catalyst composition according to claim 2.

References Cited

UNITED STATES PATENTS

| | | | |
|---|---|---|---|
| 3,135,702 | 6/1964 | Vries et al. | 260—94.9 |
| 3,189,589 | 6/1965 | Witt | 260—94.9 |
| 3,288,769 | 11/1966 | Coldfield | 260—94.9 |
| 3,310,547 | 3/1967 | Mirviss et al. | 260—93.7 |

JOSEPH L. SCHOFER, Primary Examiner

E. J. SMITH, Assistant Examiner

U.S. Cl. X.R.

252—429